United States Patent [19]

Knechtges

[11] Patent Number: 5,632,534
[45] Date of Patent: May 27, 1997

[54] ELECTRIC VEHICLE HAVING A HYDRAULIC BRAKE SYSTEM

[75] Inventor: Josef Knechtges, Solihull, England

[73] Assignee: Lucas Industries Public Limited Company, West Midlands, England

[21] Appl. No.: 319,649

[22] Filed: Oct. 7, 1994

[30] Foreign Application Priority Data

Oct. 7, 1993 [GB] United Kingdom ............... 9320661

[51] Int. Cl.[6] ............... B60L 7/24; B60T 13/57
[52] U.S. Cl. ............... 303/152; 303/3; 180/65.5; 180/165
[58] Field of Search ............... 303/3, 15, 20, 303/113.1, 152, 113.4, 114.1, 114.2, 114.3; 188/156, 158, 159; 318/371, 376; 180/65.1–65.8, 165, 246

[56] References Cited

U.S. PATENT DOCUMENTS

| | | | |
|---|---|---|---|
| 4,270,806 | 6/1981 | Venkataperumal et al. | 303/3 |
| 4,327,414 | 4/1982 | Klein | 188/158 |
| 4,962,969 | 10/1990 | Davis | 303/3 |
| 5,253,929 | 10/1993 | Ohori | 303/3 |
| 5,294,191 | 3/1994 | Giorgetti et al. | |
| 5,322,352 | 6/1994 | Ohno et al. | 303/3 |
| 5,326,158 | 7/1994 | Ohori et al. | 303/3 |
| 5,378,053 | 1/1995 | Patient et al. | 188/158 |
| 5,399,000 | 3/1995 | Aoki et al. | 303/3 |
| 5,427,442 | 6/1995 | Heibel | 303/114.3 |

FOREIGN PATENT DOCUMENTS

| | | | |
|---|---|---|---|
| 0379329 | 7/1990 | European Pat. Off. | |
| 4225080 | 2/1993 | Germany | 303/3 |
| 1444865 | 8/1976 | United Kingdom. | |

*Primary Examiner*—Robert J. Oberleitner
*Assistant Examiner*—Chris Schwartz
*Attorney, Agent, or Firm*—Oblon, Spivak, McClelland, Maier & Neustadt, P.C.

[57] ABSTRACT

An electric-powered vehicle having a drive system which includes at least one electric motor which is controlled and monitored by an electric control system for driving at least one vehicle wheel in a traction mode of the motor and also for selectively providing a contribution to overall braking torque when operated in a braking mode, and which also provides a hydraulic braking system which is actuated by the vehicle driver and which operates on at least the front wheels of the vehicle. The hydraulic braking torque produced by the driver by way of the hydraulic braking system, is adjusted in such a manner that, for the purpose of modulating the overall braking torque effective at the vehicle wheels the variation of the electric torque is arranged to stay within the "regenerative range" of operation of the electric motor, at least under predetermined operating conditions of the vehicle.

4 Claims, 10 Drawing Sheets

SEQUENTIAL APPLICATION OF REGENERATIVE AND HYDRAULIC BRAKE SYSTEMS

ELECTRIC VEHICLE HAVING A HYDRAULIC BRAKE SYSTEM

BACKGROUND OF THE INVENTION

1. Field of the Invention

The present invention is concerned with electric-powered vehicles having a drive system which includes one or more electric motors controlled and monitored by an electronic control system, and which also includes an hydraulic braking system which is operated by the vehicle driver which operates on at least the front wheels of the vehicle.

2. Discussion of the Background

Drive systems in electrically powered vehicles are usually of one of two types, namely the type where there is a respective electric motor drive unit associated with each of a plurality of wheels (referred to as motor-in-wheel drive units) and the type which has a single central electric motor and gearbox, with a conventional differential and drive shafts. The present invention is applicable equally well to both of these motor drive configurations, although the motor-in-wheel arrangement is probably preferred.

For deceleration of such a vehicle, in addition to the hydraulic brake torque $M_{Hydraul}$, which is effected by the driver-operated brake system, an electric brake torque $M_{Electr}$, from the electric propulsion motor(s) is available and usable. This arises from the well known effect that certain motors, when mechanically driven with the energizing current removed, operate as dynamos and generate a current but with a resultant braking moment acting against the applied mechanical effort, thus effectively acting as a brake.

As a consequence, the total brake torque $M_{Brake}$ on a vehicle wheel is given $$M_{Brake} = M_{Hydraul} + M_{Electr}.$$

Since a vehicle battery has only a limited available capacity, it is found useful to charge the vehicle battery by supplying to it the "dynamo" current generated by the electric brake torque $M_{Electr}$. This process is referred to as "regenerative braking".

With such a braking system, a simple anti-lock (ABS) braking arrangement can be realized modulation of the electric current applied to the electric driving motor(s) and hence of the brake torque.

With a conventional hydraulic ABS, the brake torque is proportional to brake pressure. Similarly, electric brake torque is largely proportional to electric motor current which can be controlled by, for example, pulse width modulation techniques. Thus, if excessive wheel slip occurs, the electric brake torque is arranged to be reduced. After wheel recovery, the electronic control unit (ECU) controlling the braking system reactivates the electric drive. The ABS algorithm can be substantially the same as for hydraulic brakes and vehicle performance will be maintained if electric motor torque reduction is sufficient for wheel recovery (see accompanying FIG. 1).

Anti-lock (ABS) braking is always required if the brake torque $M_{brake}$ exceeds the anti-lock torque $M_{lock}$ at which the wheel locks and which depends inter alia on the coefficient of friction between the tire and the road surface, i.e. when $$M_{Brake} > M_{Lock}$$

For anti-lock braking, two basic cases must be distinguished. First, in the case that $$M_{Lock} > M_{Hydraul}$$

which occurs on road surfaces of high coefficient of friction (high mu), the modulation of the brake torque $M_{Brake}$ required for the anti-lock operation can be effected by variation of the electric torque component $M_{Electr}$ by controlling the electric current supplied to the relevant electronic motor. In this case, the anti-lock procedure would be executed wholly within the "regenerative range" of operation, without additional consumption of electrical energy. If, on the other hand, $M_{Lock} < M_{Hydraul}$ which may occur on surfaces of low coefficients of friction (low mu), the electric motor has to be arranged to produce a counter-acting torque $M_{Contra}$ (= $M_{Lock} - M_{Hydraul}$) because the wheel must be driven against the hydraulic torque $M_{Hydraul}$ if wheel lock is to be avoided. This procedure would happen outside of the "regenerative range" and cause an additional consumption of electrical energy.

Such a process would in principle still be practicable in the case of an extremely small electrical counter torque $M_{contra}$, but in the case of an extremely low coefficient of friction (adhesion), which would occur for example with a road surface covered with snow or ice, and hence producing a very small anti-lock torque $M_{Lock}$, such a procedure would be inoperative because the counter torque $M_{Contra}$ to be overcome would be too great.

As the advantages of anti-lock systems are mainly effective in the case of low coefficients of adhesion, it would thus be necessary to include already known means for the purpose of hydraulic pressure modulation, which would result in disadvantages such as an increase in weight, a requirement for additional installation space, an increased expenditure in connection with the assembly and hence an overall increase in costs.

SUMMARY OF THE INVENTION

It is an objective of the present invention to avoid these disadvantages of the above described basic system.

In accordance with the present invention, the hydraulic braking torque, $M_{Hydraul}$, produced by the driver by way of the hydraulic braking system, is adjusted in such a manner that, for the purpose of modulating the braking torque $M_{Brake}$, the variation of the electric torque $M_{Elect}$ always lies within the "regenerative range".

As a means for adjusting the hydraulic braking torque, it is preferred to use an electronically controlled booster, such as that described in our European Patent Application No. EP-A-0379329, to which reference is hereby directed.

By use of the invention, a reduction of the hydraulic torque $M_{Hyrdaul}$ becomes possible in the case of low and very low coefficients of friction so that the electric component $M_{Electr}$ can be varied within the "regenerative range" to modulate the brake torque $M_{Brake}$ for anti-lock control. The advantage of this is that an anti-lock control is achieved on the one hand without loss of operational efficiency and on the other hand without causing stress on the vehicle battery.

Other advantages result from the fact that the use of, for example, an electrically controlled booster is more cost-effective than the installation of a conventional anti-lock system.

It is also advantageous that the decrease of the torque of the electric motor, and by this the available electric brake torque $M_{Electr}$ which is caused by the electro-magnetic force during increasing motor speed or vehicle velocity, respectively, can be compensated by increasing the hydraulic torque $M_{Hydraul}$.

Also, it is possible for the hydraulic torque $M_{Hydraul}$ to be varied in dependence upon the state of charge of the vehicle battery during each braking operation. For example, in the situation that the vehicle battery is fully charged, braking within the "regenerative range" is less relevant since the battery could be damaged by over charging in certain circumstances. In this situation, therefore, it is preferable to arrange for the hydraulic component $M_{Hydraul}$ to be more weighted and significant. This would also ensure that the hydraulic brake is applied sufficiently often to prevent corrosion of the brake disc from occurring.

The invention is described further hereinafter, by way of example only, with reference to the accompanying drawings, in which.

DESCRIPTION OF THE PREFERRED EMBODIMENTS

Figure 8:
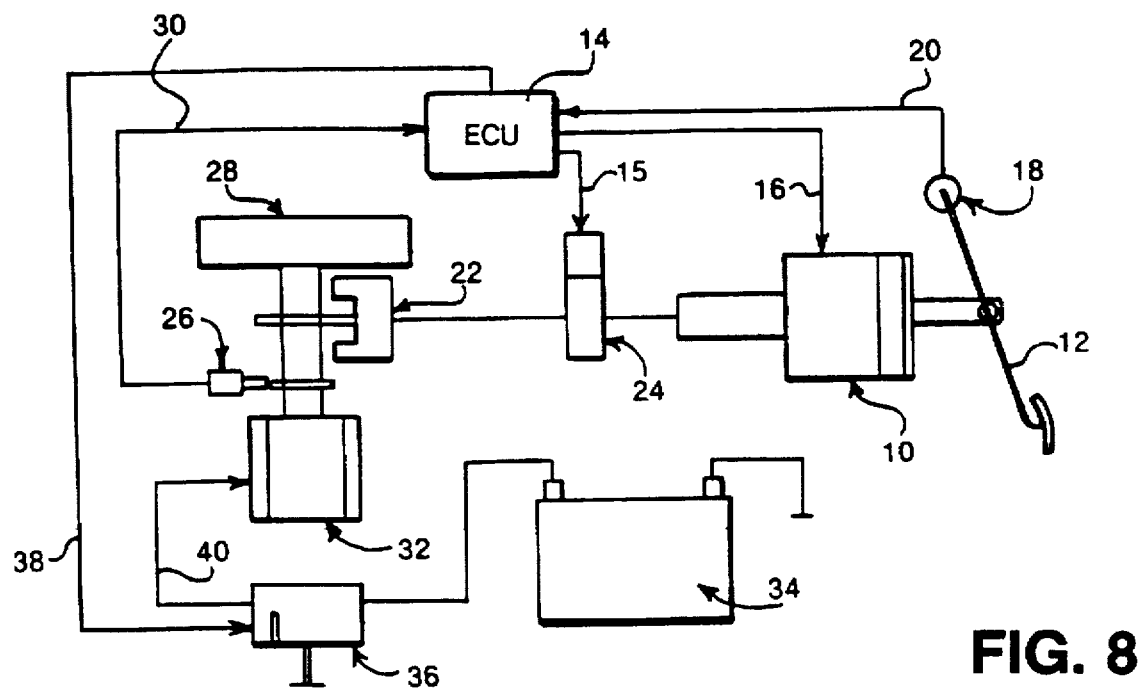
FIG. 8 is a diagrammatic illustration of a braking system in accordance with the present invention combining hydraulic and electric traction braking with an electronic booster.

Referring now to FIG. 8, there is shown in highly diagrammatic form a generalized system view of a vehicle braking system in accordance with the present invention having electric traction braking, hydraulically operated friction braking, and means for enabling the hydraulic boost ratio to be adjusted to enable electric braking in the "regenerative range" to be retained.

The system of FIG. 8 includes a hydraulic brake comprising a master cylinder and variable electronic booster unit 10, which can be of the type described in our EP-A-0379329, which has a mechanical input from a foot pedal 12 and an electrical input from an electronic control unit (ECU 14) via a line 16. A sensor 18 is associated with the foot pedal 12 to provide an electrical demand/pedal displacement signal to the ECU 14 via a line 20. The hydraulic output of the variable electronic booster and master cylinder assembly 10 is coupled to a conventional friction brake 22 by way of a conventional ABS modulator 24 which is controlled electrically by the ECU 14 via a line 15 in accordance, inter alia, with wheel speed signals from a wheel speed sensor 26 associated with a vehicle wheel 28 to be braked. The signals from the wheel speed sensor are coupled to the ECU 14 via a line 30.

The vehicle is of the type having an electric propulsion system and in this embodiment, the system comprises a separate driving motor 32 and gearbox with a constant transmission ratio for each of a plurality of vehicle wheels 28 (only one being shown). The motor 32 would normally be of the asynchronous type which will act as a generator when under overrun conditions when it is being driven by the momentum of the vehicle. The motor 32 is energized from a battery 34 via a motor controller and battery monitor device 36 which is coupled to the ECU 14 by a line 38 and to the motor 32 via a line 40.

In the present system, the electric motor 32 is used not just for traction and regenerative braking but also for ABS control by suitable modulation of the brake torque. As mentioned hereinbefore, electric brake torque is essentially proportional to electric motor current, which can be controlled via the ECU 14 by, for example, pulse width modulation. If excessive wheel slip occurs, the torque of the motor 32 is arranged to be reduced, the drive being re-actuated after wheel recovery.

Figure 4:
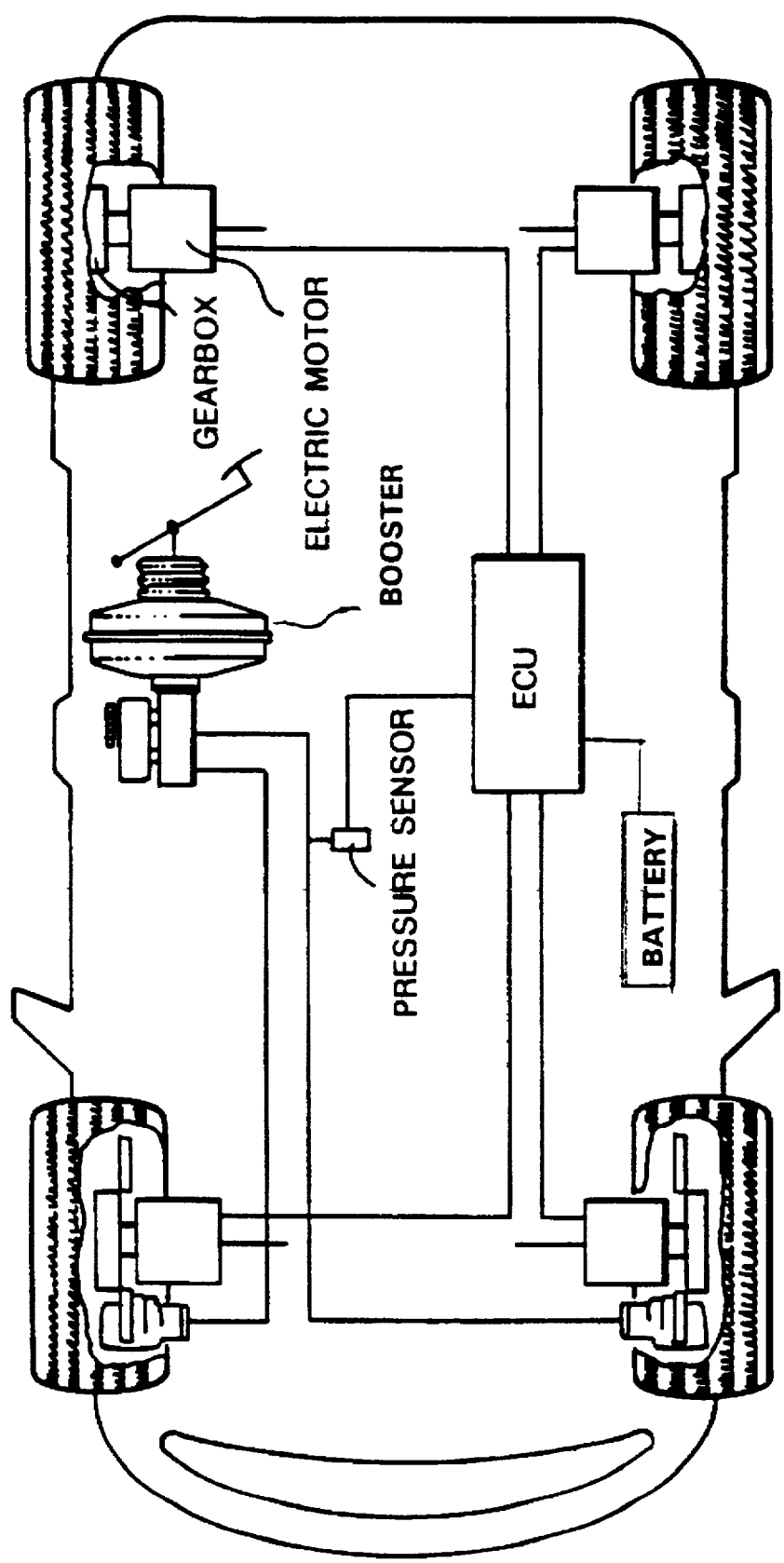
FIG. 4 shows diagrammatically the installation of a pressure sensor in a vehicle which responds to the pressure in the hydraulic brake system and signals the vehicle ECU accordingly.

A hydraulic pressure sensor as shown at 42 in FIG. 4, or the more inexpensive brake pedal travel sensor 18 of FIG. 8, is able to translate the driver braking demand into the ECU 14, so that braking force performed by the electric motor(s) 32 can be varied.

Figure 5A:
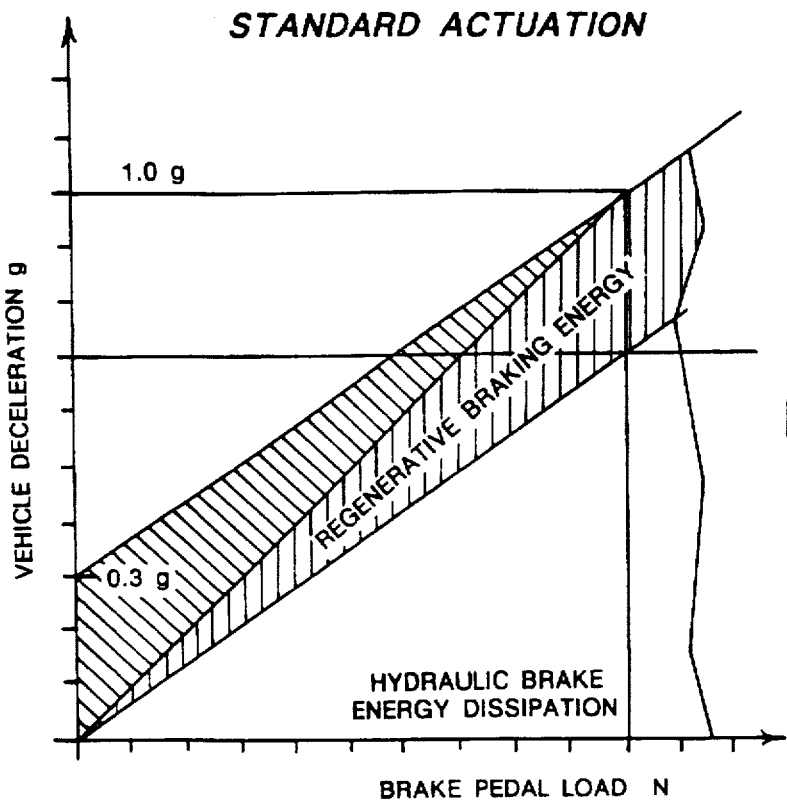
FIG. 5a illustrates graphically regenerative braking without the present invention.
Figure 5B:
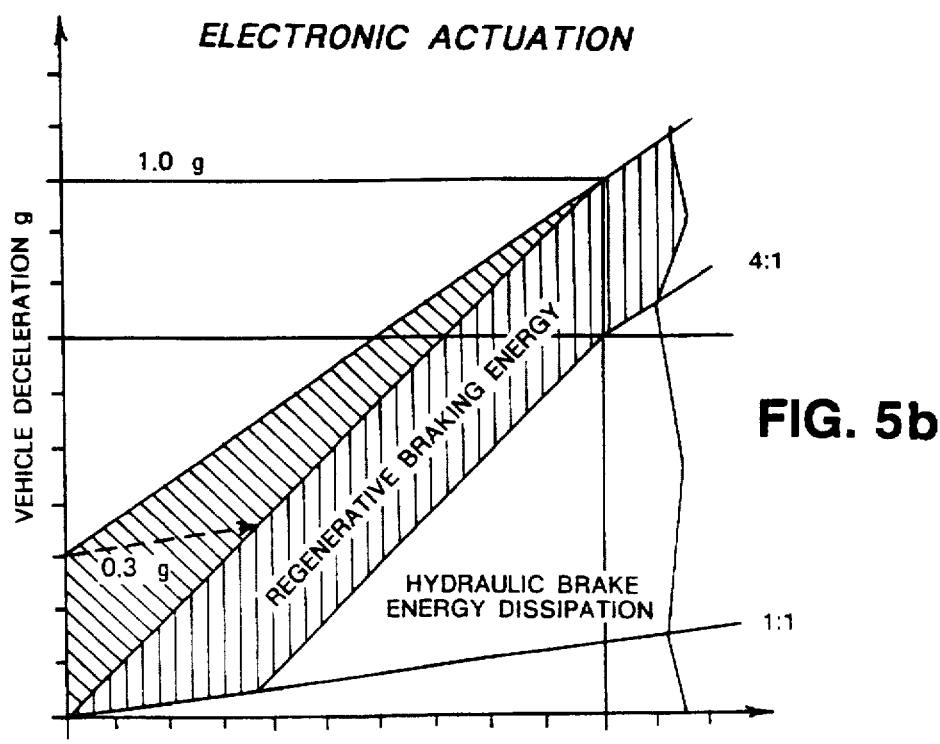
FIG. 5b illustrates graphically regenerative brake with the aid of the present invention.
Figure 6:
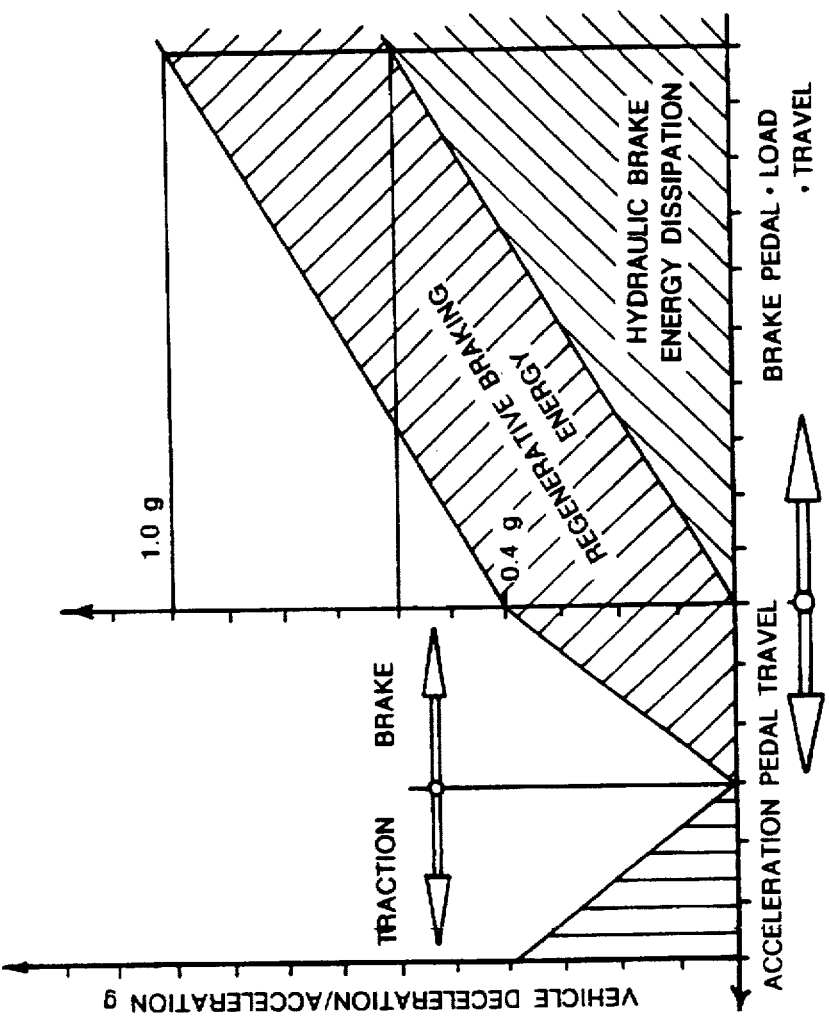
FIG. 6 illustrates graphically sequential application of regenerative and hydraulic brake systems.
Figure 6:
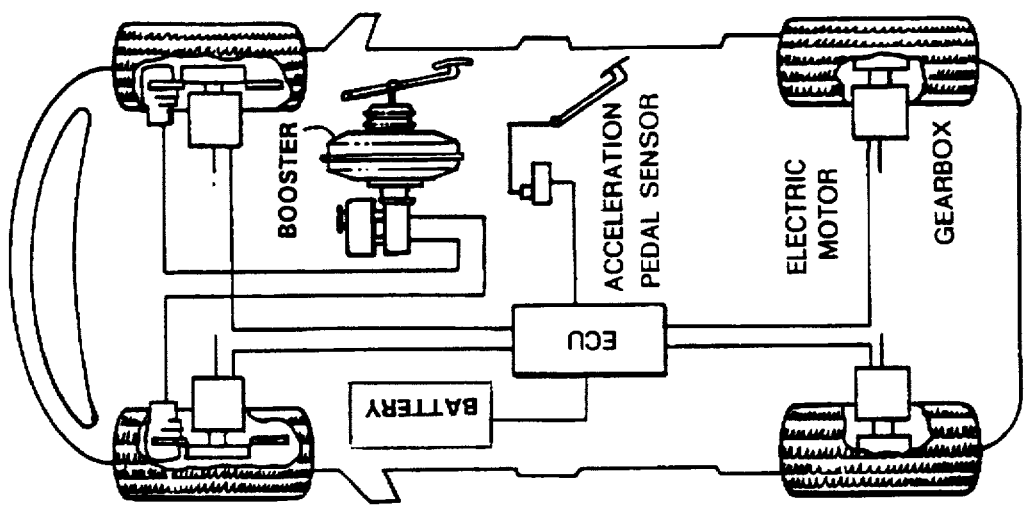

The total brake force is the sum of both hydraulic and electric forces. As illustrated in FIGS. 5a and 5b, the maximum brake torque generated by the electric motor is available at, for example, 1 g vehicle deceleration, the motors themselves then contributing about 0.3 g, depending on vehicle load condition. Because of this sharing of the braking force, the regenerative energy is not fully utilized in all brake applications lower than 1.0 g (FIG. 5a).

Figure 7:
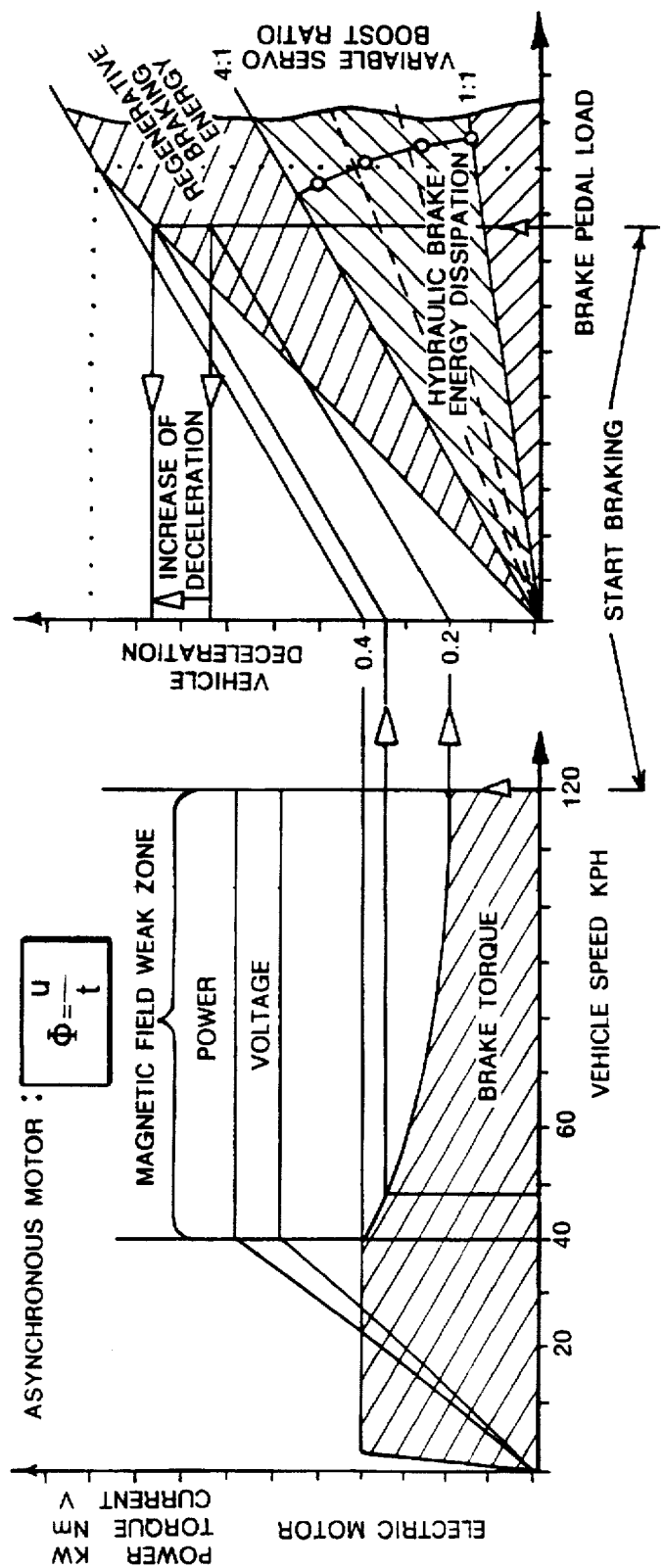
FIG. 7 illustrates graphically the interaction between an electric traction motor and an electronically controlled booster.

FIG. 7 shows the characteristic curve of an asynchronous electric motor relating performance, torque and voltage, and showing that all of them vary with vehicle speed. A finite amount of motor rotor slip is necessary to obtain a minimum of brake torque from the electric motor. At very low vehicle speed (below say 5Kph), rotor slip cannot be kept up by using the electric motor as a generator, and as a result, the electric brake force cannot be guaranteed any longer. Similar behavior is found at vehicle speeds above about ⅓ of the maximum speed. This is caused due to weakening of the electric magnetic field in order to reduce motor size and weight and for cost purposes. Above this speed, there is a constant power output but reduced motor torque for traction and braking.

This characteristic of different motor torque varying with speed would normally lead to variable vehicle deceleration in spite of constant pedal effort (FIG. 7). However, the provision of the electronic booster 10 in the present system can compensate for this irregular behavior by virtue of its variable servo boost ratio which enables the hydraulic braking torque, deriving from the driver's actuation of the foot pedal 12, to be adjusted in such a manner that the variable electric brake torque remains constantly within the "regenerative range", so that electric braking remains effective, even at low speeds and on low mu road surfaces.

Referring again to FIGS. 5a and 5b, it is seen that in a typical case the electric motor contributes about 0.3 g to the vehicle deceleration. FIG. 5a shows an increase of the hydraulic brake force proportional to the brake pedal force in the event of the use of a conventional standard (non-variable) booster. This has the disadvantage that the maximum electronic brake force (0.3 g) is available only when the vehicle deceleration exceeds 1 g. This disadvantage is avoided by an appropriate adjustment of the hydraulic force as illustrated in FIG. 5A using, in this embodiment, the electronically controlled booster 10. The booster ratio is arranged to be held at its minimum value of 1:1 until maximum electric motor contribution to vehicle deceleration is reached. For higher decelerations above this point an increase of the booster ratio is adjusted such that the electric motor can make its maximum contribution to vehicle deceleration by staying in the regenerative range as long as possible.

This has another advantage in that the maximum capacity for recharging of the vehicle battery is provided. The aforegoing arrangement also has the advantage that it is guaranteed that the hydraulic brake is always operated at some point in the braking cycle so that corrosion of the brake disc is prevented.

To enable the necessary control of the electronic booster 10, in addition to the usual wheel-speed signals provided by the sensor 26, it is necessary to obtain signals representative of brake pedal force and electric motor torque. Brake pedal force is represented in the present embodiment by the signal from the pedal displacement transducer 18. Electric motor torque can be determined from a measurement of the motor current, for example in the motor controller unit 36.

Figure 1:
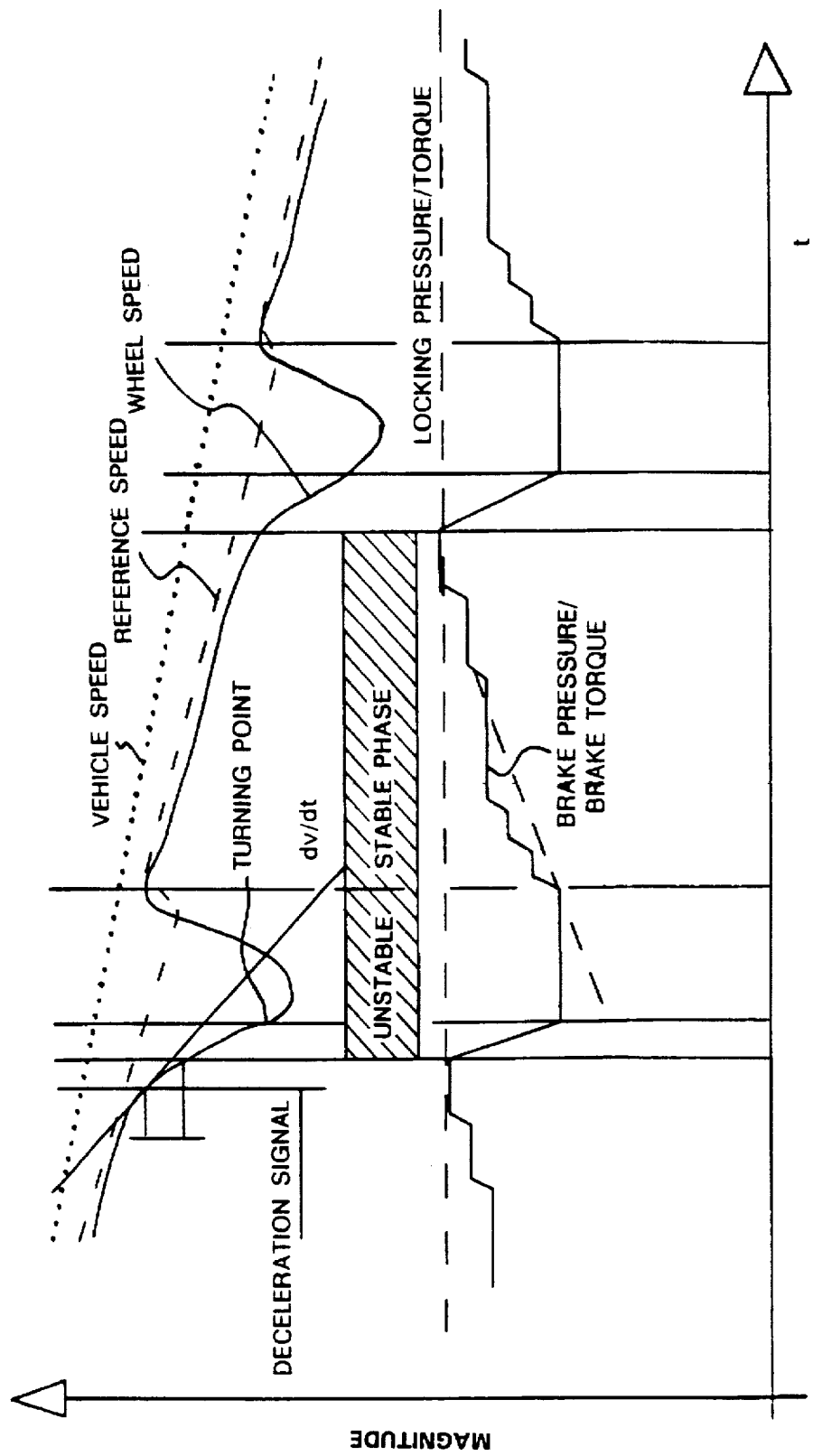
FIG. 1 illustrates graphically the difference/similarities in ABS control cycles for hydraulic and electric brake systems.
Figure 2:
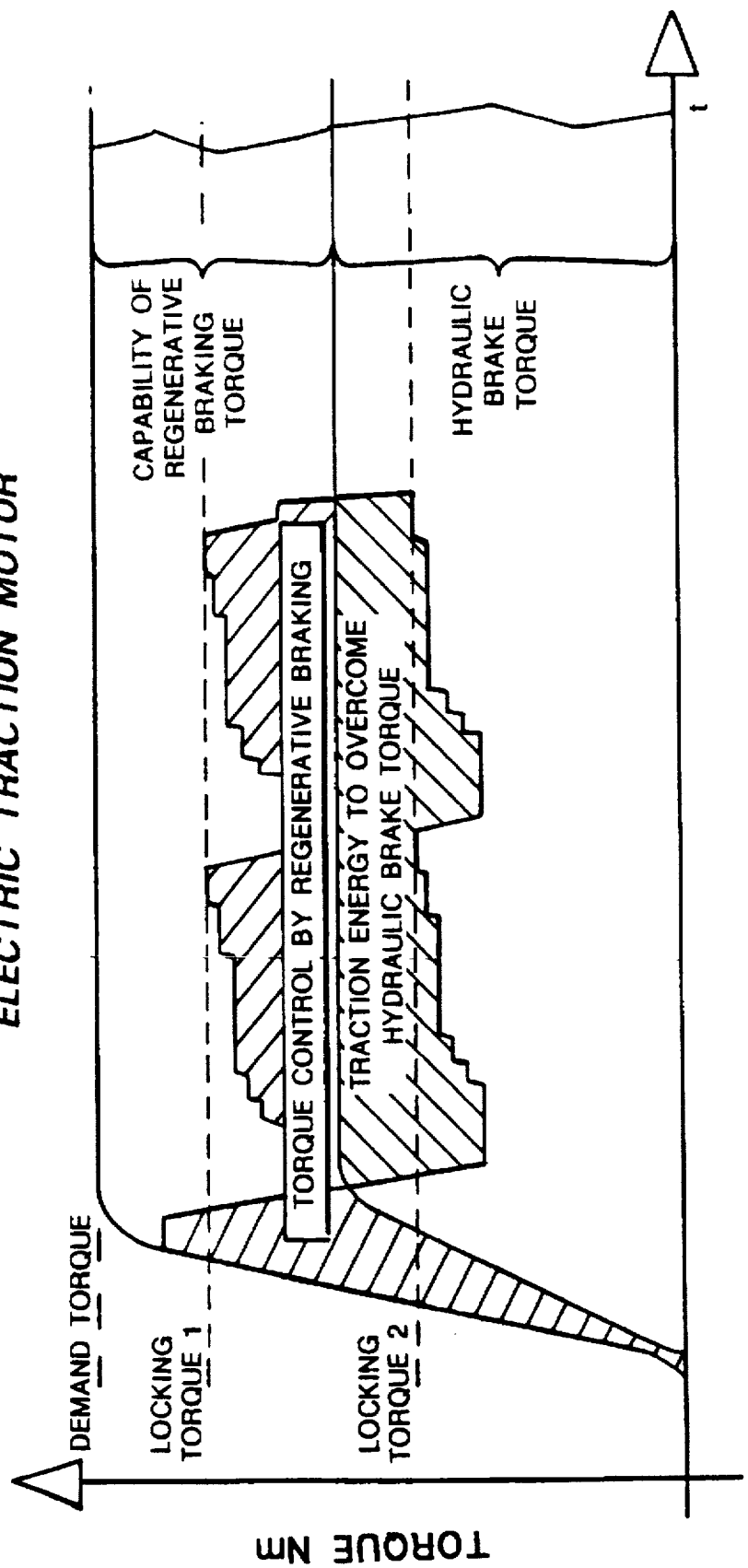
FIG. 2 illustrates graphically ABS control using an electric traction motor.
Figure 3:
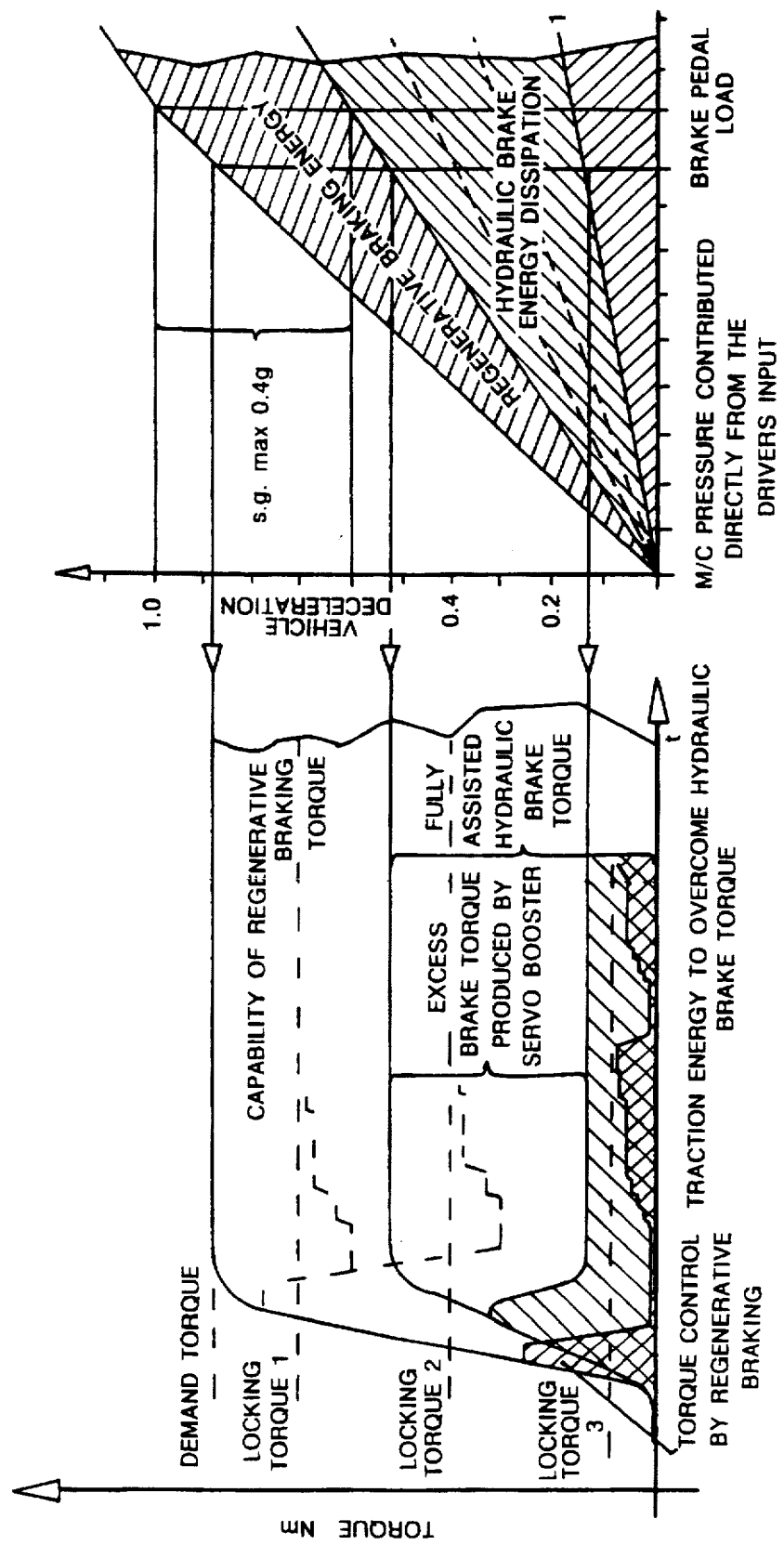
FIG. 3 illustrates graphically ABS control using an electric traction motor in combination with an electronically controlled booster.

The procedure in the case of high and low coefficients of friction is illustrated in FIG. 2 and FIG. 3. Specifically, low coefficients of friction are treated in FIG. 3 by the corresponding locking torque 3.

Figure 9:
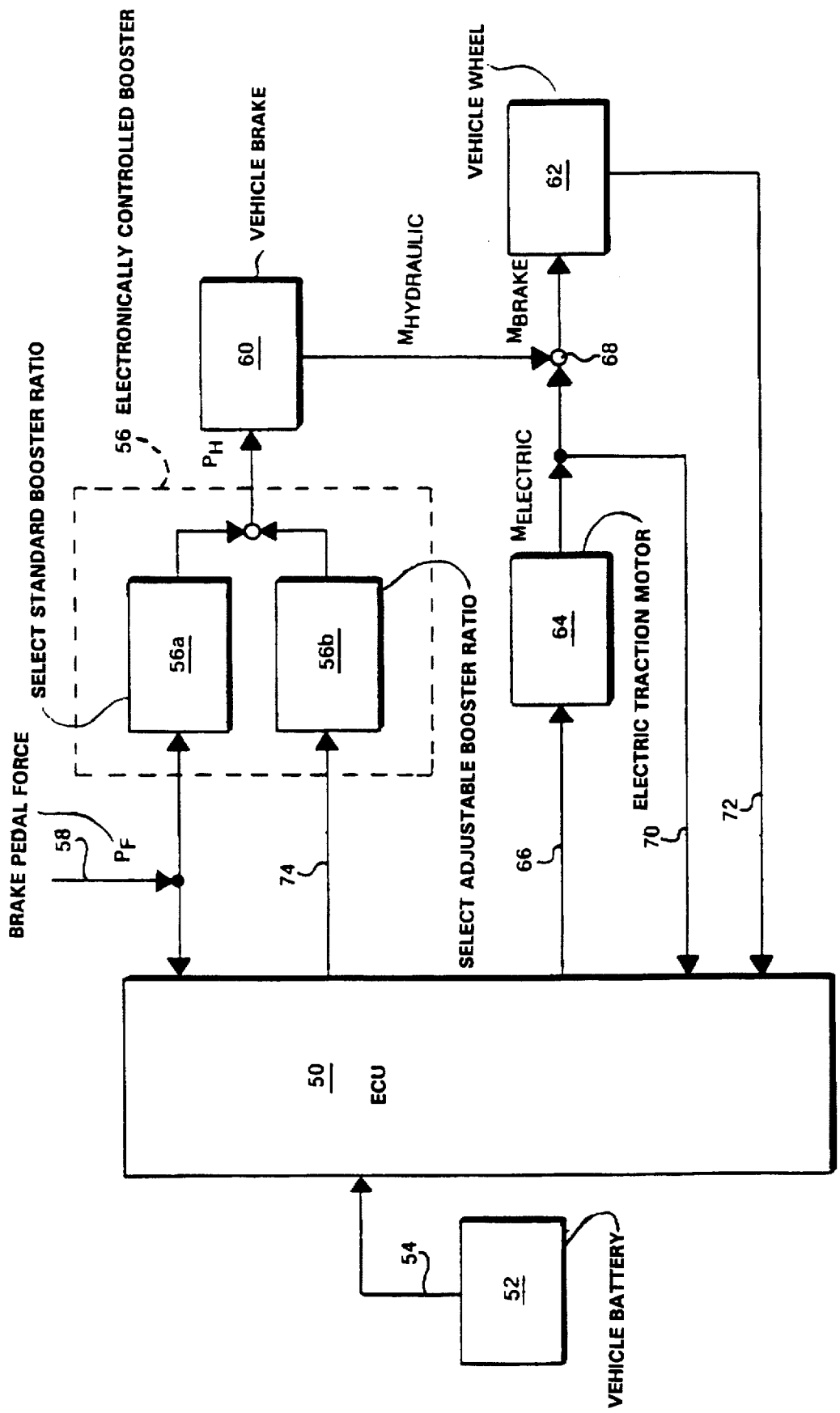
FIG. 9 is a further illustration of one possible embodiment in accordance with the invention for performing hydraulic control adjustment to keep the electric braking within the "regenerative range"

One possible manner in which the aforegoing control of the electronic booster in the hydraulic circuit can be achieved is shown in diagrammatic form in FIG. 9 to which reference is now made.

Referring now to FIG. 9, there is shown an electronic unit (ECU) 50 which receives an input from the vehicle battery 52 on line 54 indicative of the state of charge of the battery. An electronically controlled booster 56 is illustrated diagrammatically as including a part 56a which enables a standard booster ratio of 1:1 to be selected and a part 56b which enables an adjustable booster ratio to be selected. The ECU 50 and standard brake part 56a receive an input on a line 58 representative of brake pedal force. The output of both part 56a,56b are coupled to the vehicle brake 60 which results in a hydraulic brake torque $M_{Hydraul}$ which is applied to the vehicle wheel 62. An electric traction motor 64 receives control via line 66 in with dependence upon the electronic drive motor demand determined via the ECU 50, the motor generating an electric braking torque $M_{Elects}$ which is added at 68 to $M_{Hydraul}$ and applied to the wheel 62. The electric brake torque $M_{Elects}$ is also supplied to the ECU 50 via connection 70. Data derived from the turning behavior of the vehicle wheel 62, such as speed and deceleration, which are required to calculate vehicle speed and vehicle deceleration, and applied to the ECU 50 via a connection 72. The ECU 50 also outputs a signal on line 74 representative of the demand for the electrically controlled booster 56b.

On operation of the brake pedal by the driver, a brake pedal force $P_F$ on line 58 is transformed in the booster device 56 into a hydraulic brake pressure $P_H$ for actuating the vehicle brake 60 which then provides a hydraulic brake torque $M_{Hydraul}$.

The electric traction motor which is controlled by the electronic control unit 50 makes an electric brake torque $M_{Elects}$ available, so that the total brake torque $M_{Brake}$ for braking of the vehicle wheel 62 results from the sum of hydraulic brake torque $M_{Hydraul}$ and electric brake torque $M_{Elects}$.

In the case of a fully charged battery, steps should be possible to inhibit regenerative braking since the battery could be damaged in an attempt to charge the battery further in this condition. Monitoring of the state of charge of the battery (battery voltage) is therefore carried out so that, in the case of a fully charged battery, the booster ratio can be increased such that the electric brake force is replaced by the increase in hydraulic brake force to maintain the total brake force constant.

In a situation where the vehicle is being braked on a very low mu surface (low adhesion), it is advantageous for the electric motor to be driven against the action of the hydraulic brake torque when, with a standard booster, the hydraulic brake torque is greater than the locking torque. This is illustrated in FIG. 2 (locking torque 2). To avoid this disadvantage, the hydraulic brake torque is adjusted by, in this case, the electronically controlled booster such that the hydraulic brake torque is less than the locking torque, the ABS control being executed by variation of electric braking torque (as shown in the graphs of FIG. 3).

Figure 10:
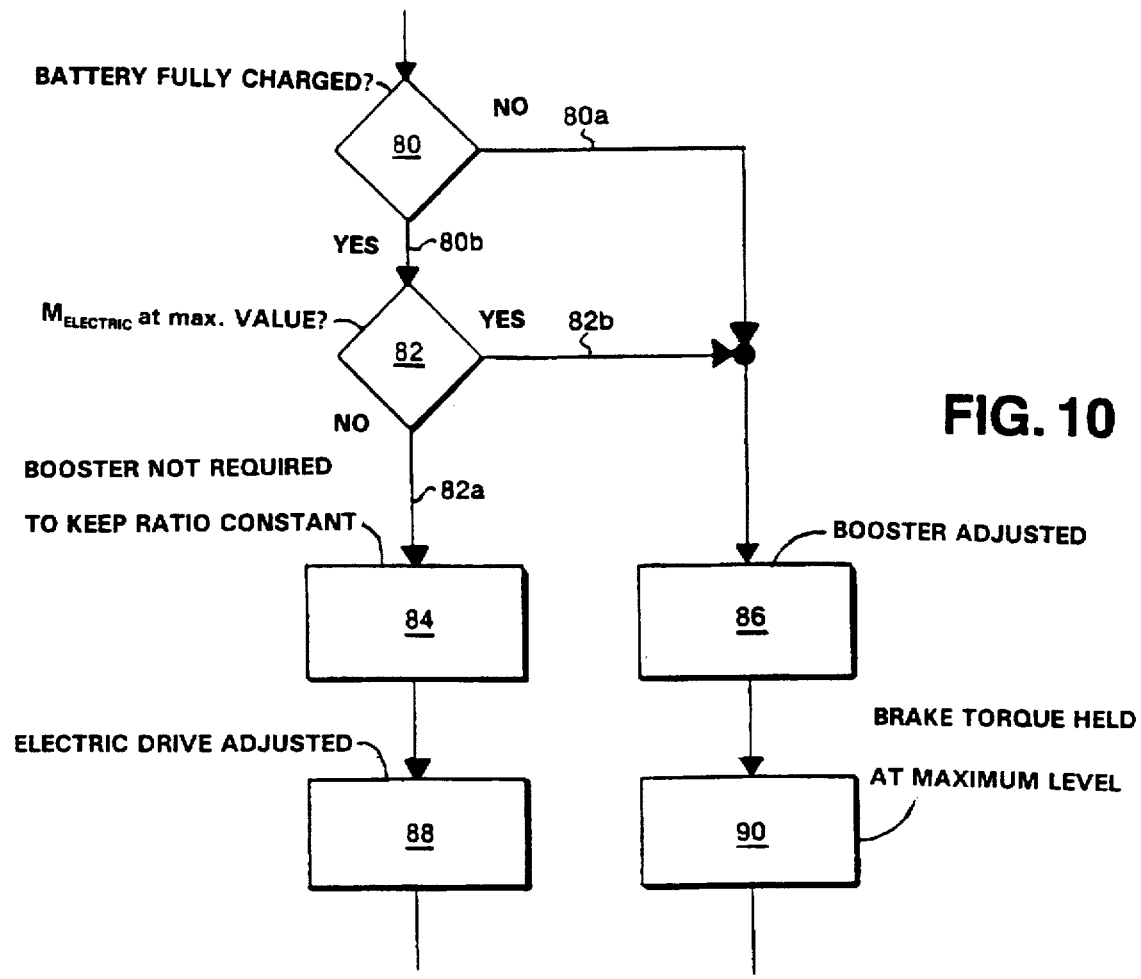
FIG. 10 is a flow diagram illustrating the operation of the embodiment of FIG. 9.

Referring now to FIG. 10 there is shown a simplified flow chart illustrating how the inputs of electric brake torque $M_{Elects}$ and state of charge of the vehicle battery are processed in the ECU 50. The various steps are identified by number as follows:

Step 80: decision depending on state of charge of vehicle battery (52).

Step 80a: path in the case that vehicle battery is NOT fully charged.

Step 80b: path in the case that vehicle battery is fully charged.

Step 82: decision depending on electric brake torque $M_{Elect}$.

Step 82a: path in the case that electric brake torque has NOT reached its maximum value, which corresponds to a contribution in the order of magnitude of 0.3 g of total vehicle deceleration.

Step 82b: path in the case that electric brake torque is already at its maximum.

Step 84: action so that electronically controlled booster (3) is NOT required to keep booster ratio constant at its minimum of 1:1.

Step 86: action so that demand of electronically controlled booster (11) is adjusted to an optimum condition depending on graph of vehicle declaration over brake pedal load.

Step 88: action so that demand of electric drive motor (64) is adjusted to an optimum condition depending on the graph of vehicle deceleration over brake pedal load.

Step 90: action so that the electric brake torque is held at its maximum level to make regenerative braking in optimum condition possible in dependence upon the state of charge of the battery.

It should be noted that the inputs of vehicle deceleration and brake pedal load in steps 86 and 88 are available in the electronic control unit from the brake pedal force and wheel data. The corresponding graph for adjustment is shown in FIG. 3.

We claim:

1. An electric-powered vehicle having a drive system which comprises:

at least one electric motor which has an electrical supply and is controlled and monitored by an electric control system driving at least one vehicle wheel in a drive mode of operation of the motor and also varying the electric torque to selectively provide a contribution to an overall braking torque of the vehicle when controlled by said control system to operate in a braking mode, which also includes a hydraulic braking system which is actuated by a vehicle driver, and which operates on at least front wheels of the vehicle, a first mechanism adjusting hydraulic braking torque, produced by the vehicle driver by way of the hydraulic braking system in such a manner that, for modulating overall braking torque effective at said wheels, variation of electric torque produced by said motor stays within a regenerative range of operation of the electric motor, said first mechanism comprising an electronically controlled booster enabling a variable booster ratio to be selected electronically a second mechanism controlling the electrical supply to the electric motor and modulating said overall braking torque for braking in an ABS anti-lock mode such that, if excessive wheel slip occurs, the electric motor torque is reduced; and a third mechanism allowing control of the braking system when hydraulic brake torque alone exceeds wheel locking torque, by which the electric brake torque produced by said electric motor is removed, and an additional tractive torque is then produced by said electric motor and applied to counteract the hydraulic brake torque.

2. An electric powered vehicle according to claim 1, which comprises a foot operated brake pedal wherein said electronically controlled booster comprises a hydraulic master cylinder unit coupled to said foot operated brake pedal.

3. An electric powered vehicle according to claim 2, which comprises a third mechanism operable below a predetermined deceleration level demanded by the vehicle driver, said second mechanism holding the booster ratio at a minimum value until maximum electric motor contribution to vehicle deceleration has been reached.

4. An electric powered vehicle according to claim 1, which comprises a fourth mechanism responsive to the state of charge of the vehicle battery such that, if the battery is detected by said fourth mechanism responsive to the state of the charge as being at a full charge, braking within the regenerative range is restricted and the hydraulic component to said overall braking torque is weighted.

* * * * *

UNITED STATES PATENT AND TRADEMARK OFFICE
CERTIFICATE OF CORRECTION

PATENT NO. : 5,632,534
DATED : May 27, 1997
INVENTOR(S) : Josef KNECHTGES, et al.

It is certified that error appears in the above-indentified patent and that said Letters Patent is hereby corrected as shown below:

On the title page, in item [75], the inventor's residence should read:

--Mayen, Germany--

Signed and Sealed this

Thirtieth Day of September, 1997

Attest:

BRUCE LEHMAN

Attesting Officer          Commissioner of Patents and Trademarks